US008602174B2

(12) United States Patent
Aulanko et al.

(10) Patent No.: US 8,602,174 B2
(45) Date of Patent: Dec. 10, 2013

(54) APPARATUS AND METHOD FOR INSTALLING ELEVATOR ROPES

(75) Inventors: Esko Aulanko, Kerava (FI); Jorma Mustalahti, Hyvinkää (FI)

(73) Assignee: Kone Corporation, Helsinki (FI)

( * ) Notice: Subject to any disclaimer, the term of this patent is extended or adjusted under 35 U.S.C. 154(b) by 1109 days.

(21) Appl. No.: 11/362,165

(22) Filed: Feb. 27, 2006

(65) Prior Publication Data

US 2006/0231346 A1 Oct. 19, 2006

Related U.S. Application Data

(63) Continuation of application No. PCT/FI2004/000703, filed on Nov. 22, 2004.

(30) Foreign Application Priority Data

Nov. 24, 2003 (FI) ..................................... 20031706

(51) Int. Cl.
*B66B 19/02* (2006.01)
*B66B 7/00* (2006.01)
*B66B 15/02* (2006.01)
*B23P 11/00* (2006.01)

(52) U.S. Cl.
USPC .............. 187/414; 187/266; 187/900; 29/428

(58) Field of Classification Search
USPC ......... 187/250, 251, 266, 406, 414, 254, 264, 187/900; 242/615.2–615.4; 254/403, 415; 74/15, 89.22, 434
IPC ........................... B66B 7/00,7/06, 19/02, 15/02
See application file for complete search history.

(56) References Cited

U.S. PATENT DOCUMENTS 216,568 A * 6/1879 Holske .......................... 187/251
2,654,571 A * 10/1953 Albright, Jr. .................. 254/405

(Continued)

FOREIGN PATENT DOCUMENTS

| | | | | | |
|---|---|---|---|---|---|
| EP | 744522 | A1 | * | 11/1996 | ............. E05F 11/48 |
| JP | 05028814 | A | * | 2/1993 | ............... B66D 3/04 |
| JP | 11189378 | A | * | 7/1999 | ................ B66B 7/06 |
| JP | 11-246144 | A | | 9/1999 | |
| JP | 2001-122556 | A | | 5/2001 | |
| JP | 2001287878 | A | * | 10/2001 | ................ B66B 7/06 |
| WO | WO 2006079681 | A1 | * | 8/2006 | ................ B66B 7/06 |

OTHER PUBLICATIONS

Database WPI, Section PQ, Week 200403, Derwent Publications Ltd., London, GB; AN 2004-029969, XP002326371 & KR 2003 070 561 A (Dae Sung Elevator Co Ltd) Aug. 30, 2003, Abstract.

*Primary Examiner* — William A Rivera
*Assistant Examiner* — Stefan Kruer
(74) *Attorney, Agent, or Firm* — Birch, Stewart, Kolasch & Birch, LLP

(57) ABSTRACT

A method for installing the ropes of an elevator in an elevator system comprising the ropes, a diverting pulley and a frame structure for rotatably supporting the diverting pulley in place, the method including the steps of mounting the ropes on the diverting pulley and mounting the diverting pulley together with the ropes in the frame structure or, alternatively, passing the ropes via a guiding device of the frame structure and mounting the diverting pulley and a supporting element in the frame structure. Also, an elevator comprising at least one diverting pulley mounted in place by means of a frame structure and a set of ropes having a number of ropes, the passage of which has been arranged using at least one diverting pulley.

4 Claims, 3 Drawing Sheets

(56) References Cited

U.S. PATENT DOCUMENTS

Figure 1:
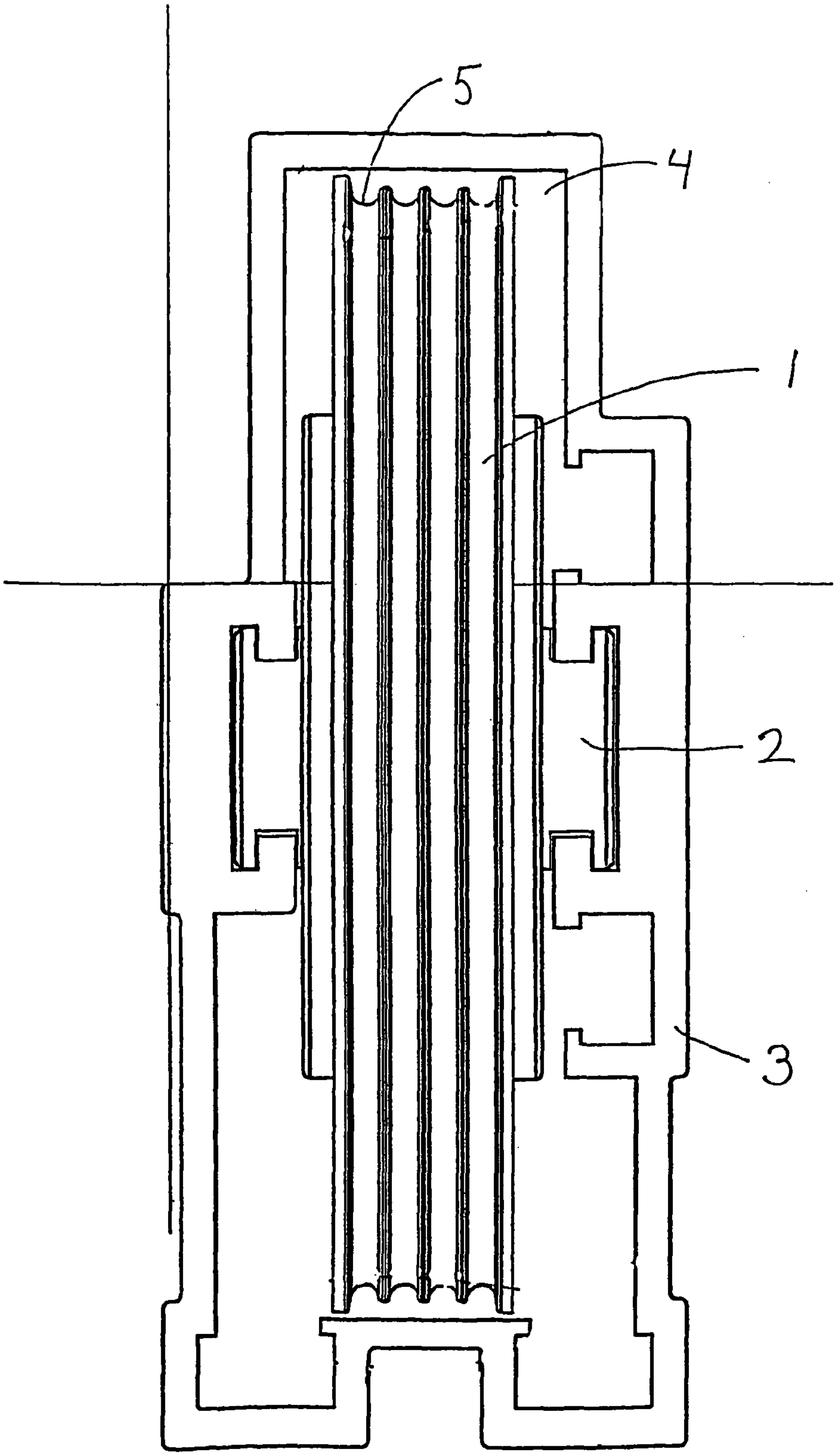

| | | | | |
|---|---|---|---|---|
| 4,936,370 | A * | 6/1990 | Uecker et al. | 160/168.1 V |
| 5,000,292 | A * | 3/1991 | Chapelain et al. | 187/408 |
| 5,040,430 | A * | 8/1991 | Adam et al. | 74/425 |
| 5,878,847 | A | 3/1999 | Mustalahti et al. | |
| 6,227,993 | B1 * | 5/2001 | Medebach | 474/144 |
| 6,364,062 | B1 * | 4/2002 | Ericson et al. | 187/264 |
| 2010/0163348 | A1 * | 7/2010 | Barneman | 187/266 |
| 2011/0308892 | A1 * | 12/2011 | Saarelainen et al. | 187/266 |

* cited by examiner

APPARATUS AND METHOD FOR INSTALLING ELEVATOR ROPES

This application is a Continuation of copending PCT International Application No. PCT/FI2004/000703 filed on Nov. 22, 2004, which designated the United States, and on which priority is claimed under 35 U.S.C. §120. This application also claims priority under 35 U.S.C. §119(a) on Patent Application No(s). 20031706 filed in Finland on Nov. 24, 2003. The entire contents of each of the above documents is hereby incorporated by reference.

The present invention relates to a method to an elevator constructed by this method, to an elevator and to the use of a diverting pulley supported by a frame structure to suspend an elevator car or equivalent.

In prior-art arrangements, elevator hoisting ropes are passed separately one at a time to diverting pulleys already mounted in place e.g. on the elevator car, in the elevator shaft or on a diverting pulley.

However, there are considerable drawbacks associated with prior-art technology. For example, passing the ropes, possibly even through long distances, in vertical and/or widthwise directions is not only difficult but may also involve a major safety risk, because the ropes may fall down and hit the person installing them. Diverting pulleys based on prior-art solutions are also very difficult to access. In addition, making adjustments on ready mounted diverting pulleys e.g. in respect of positioning and orientation is difficult.

The object of the present invention is to overcome these drawbacks and achieve a solution of a completely new type. It is an object of the invention to facilitate the installation of hoisting ropes and to render the installation work safer. A further object of the invention is to create an elevator having a simpler and safer construction than earlier elevators.

By applying the invention, it is possible to achieve an accurate positioning of the diverting pulley. In addition to this, orienting of the diverting pulley is also achieved by utilizing a frame structure. This allows faster and easier installation of the pulley, while the reliability is not so much dependent on the installation process. Moreover, the device of the invention can be used in different applications, preferably e.g. as diverting pulleys of the elevator car, counterweight or elevator shaft. In addition to this, their mounting direction is independent of the case.

The method and elevator of the invention and the use of a diverting pulley mounted by means of a frame structure according to the invention are presented in the present application Inventive embodiments are also presented in the description part of the present application. The inventive content disclosed in the application can also be defined in other ways. The inventive content may also consist of several separate inventions, especially if the invention is considered in the light of expressions or implicit sub-tasks or in respect of advantages or sets of advantages achieved. In this case, some of the attributes contained below may be superfluous from the point of view of separate inventive concepts.

The frame structure of the invention is economical in respect of construction and it can be constructed e.g. from profiled metal, preferably from profiled aluminum, in which case the structure is additionally light, too. It is also possible to integrate functional features in the frame structure. It can be provided with e.g. a separate rope guiding device or alternatively the frame structure can be provided beforehand with a groove, slot or equivalent to guide the rope.

The invention also relates to the use of a diverting pulley mounted by means of a frame structure to suspend an elevator car or equivalent. In this case, the rope passage is arranged by using at least one diverting pulley. The solution in question can thus be used in other applications as well, for example for suspending the counterweight or motor.

According to the method of the invention, the elevator ropes are installed in an elevator system comprising ropes, a diverting pulley and a frame structure for rotatably mounting the diverting pulley in place. According to the method of the invention, the method comprises stages in which the ropes are first mounted on the diverting pulley and after that the diverting pulley together with the ropes is mounted in the frame structure. In this situation, the diverting pulley already has a shaft, pin or equivalent, which has been mounted on it beforehand. In addition, the diverting pulley can be alternatively formed by combining a diverting pulley and a supporting element, such as a shaft, thereby creating an integrated element that can be installed easily and quickly while also a saving on manufacturing costs is achieved. By this method, the installation of hoisting ropes becomes considerably easier because the ropes have already been set on the diverting pulleys and no time-consuming and sometimes difficult and even hazardous rope threading operations for passing the ropes to the diverting pulleys are needed. In addition, the ropes are properly set in their grooves and are held there by a rope-jump guard. The rope-jump guard may preferably consist of the frame structure itself or a separate element.

According to another alternative method of the invention, the method comprises the following steps, whereby the ropes are first passed through a guiding device, such as a slot made in the frame structure, the diverting pulley and a supporting element, such as a shaft, are mounted in the frame structure. This method is used e.g. when the ropes do not run in the same direction but the diverting pulley forms an angle of e.g. 90 degrees between them. In this case, the frame structure preferably forms a so-called rope positioning support against which the rope is first set, whereupon the diverting pulley is placed either as separate pulley in which the shaft is mounted afterwards or alternatively the diverting pulley may have a shaft preferably mounted in it beforehand.

By the method of the invention, an elevator can be installed reliably, quickly and economically. In addition to new buildings, the method of the invention can also be used in modernization projects, and the method is not restricted to any specific elevator type, but the method in question can be applied both in elevator solutions without counterweight and in elevator solutions with counterweight. Moreover, the method can be applied in other hoisting arrangements according to need.

The elevator of the invention, which comprises at least one diverting pulley mounted in place by means of a frame structure and a set of ropes consisting of a number of ropes, the passage of which has been arranged by means of at least one diverting pulley. The ropes of the elevator of the invention are arranged on the diverting pulley by first setting the ropes on the diverting pulley and then mounting the diverting pulley together with the ropes in the frame structure.

The ropes of another alternative elevator of the invention have been arranged on the diverting pulley by first setting the ropes of the set of hoisting ropes in a guiding device, such as a slot made in the frame structure, and then mounting the diverting pulley and a supporting element, such as a shaft, in the frame structure.

The frame structure comprised in the elevator has been formed from a continuous piece. This piece may be manufactured from profiled metal, preferably profiled aluminum, in which case both an economical and easy manufacture of the structure and a lightness achieved due to the material are made use of. In addition, a similar frame structure can be used with other diverting pulleys of the elevator, thus avoiding numerous different solutions and difficult installation and adjustment work. Furthermore, the reduction of the number of different components and the modular implementation also reduce the risks and allow considerably faster installation. This is correspondingly advantageous to the final user of the elevator because the elevator can be installed faster and, for example in the case of modernization, the elevator is sooner available for use again.

The frame structure of the elevator can be provided with e.g. a separate guiding device attached to it to guide the ropes and detachable when necessary. The guiding device may naturally simply consist of a groove, slot or the like made in the frame structure to guide the rope in a desired direction and/or to a desired place.

The frame structure of the invention may preferably be symmetrical, the frame structure can be fastened by means of fastening elements in a desired fastening direction, depending on the case. The fastening elements may naturally vary according to use, so they may detachable, such as screws, bolts or equivalent, or they may be fixed elements, such as rivets or equivalent. In addition, the fastening position and direction vary depending on the application and the mounting direction varies according to need.

The frame structure of the invention either alone or together with the diverting pulley is detachable. This allows easier installation of e.g. new ropes, time-consuming and difficult rope threading tasks being thus avoided.

A number of ropes according to the invention forms a set of ropes, which preferably is a set of hoisting ropes. In this case, an advantage is derived both from pre-installed diverting pulleys with which the frame structures are already integrated and even from such complete solutions in which the entire set of ropes together with the diverting pulleys and frame structures is brought as a complete unit to the place of installation.

An elevator containing a solution according to the invention can be used in elevators e.g. in the counter-weight, in the car and/or as diverting pulleys in the shaft. In addition, the solution can be utilized both in the production of new elevators and in elevator modernization projects.

The use of a diverting pulley mounted using a frame structure according to the invention to suspend and elevator car or equivalent. In this case, the passage of the ropes has been arranged using at least one diverting pulley.

In the following, the invention will be described with reference to the attached drawings, which illustrate installation arrangements according to the invention.

Figure 2:
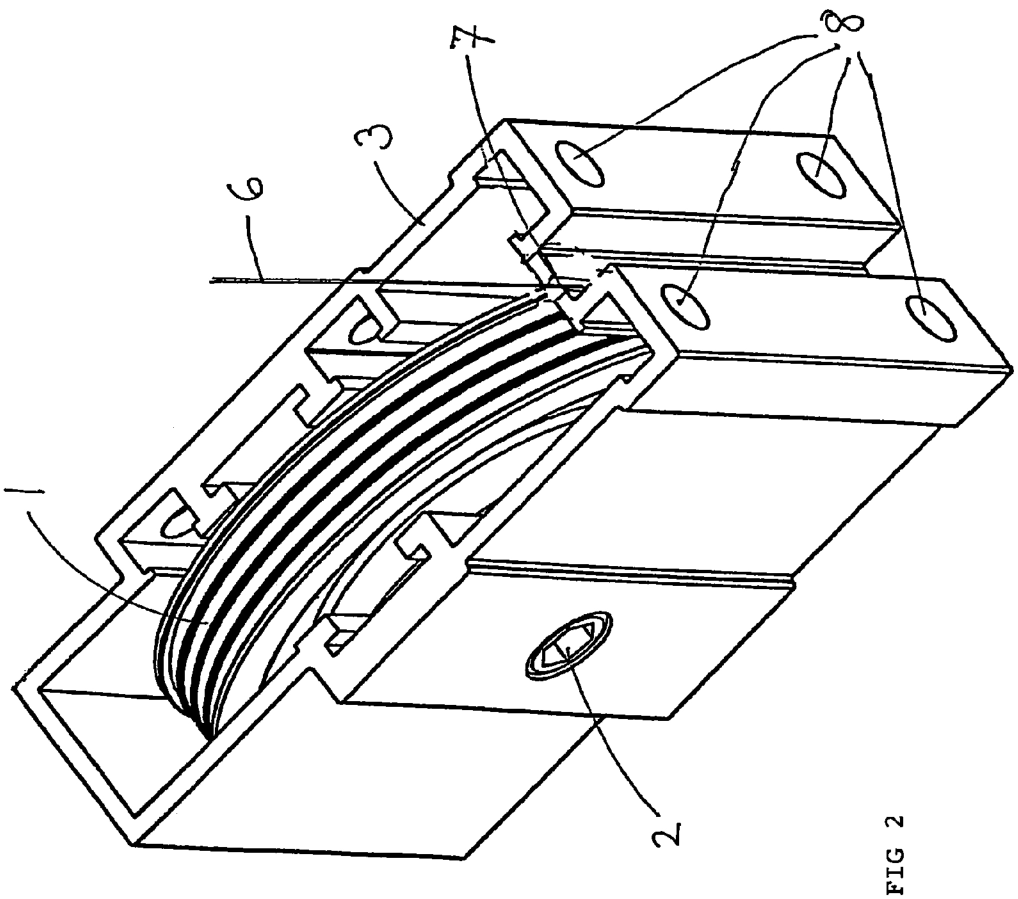
Figure 3:
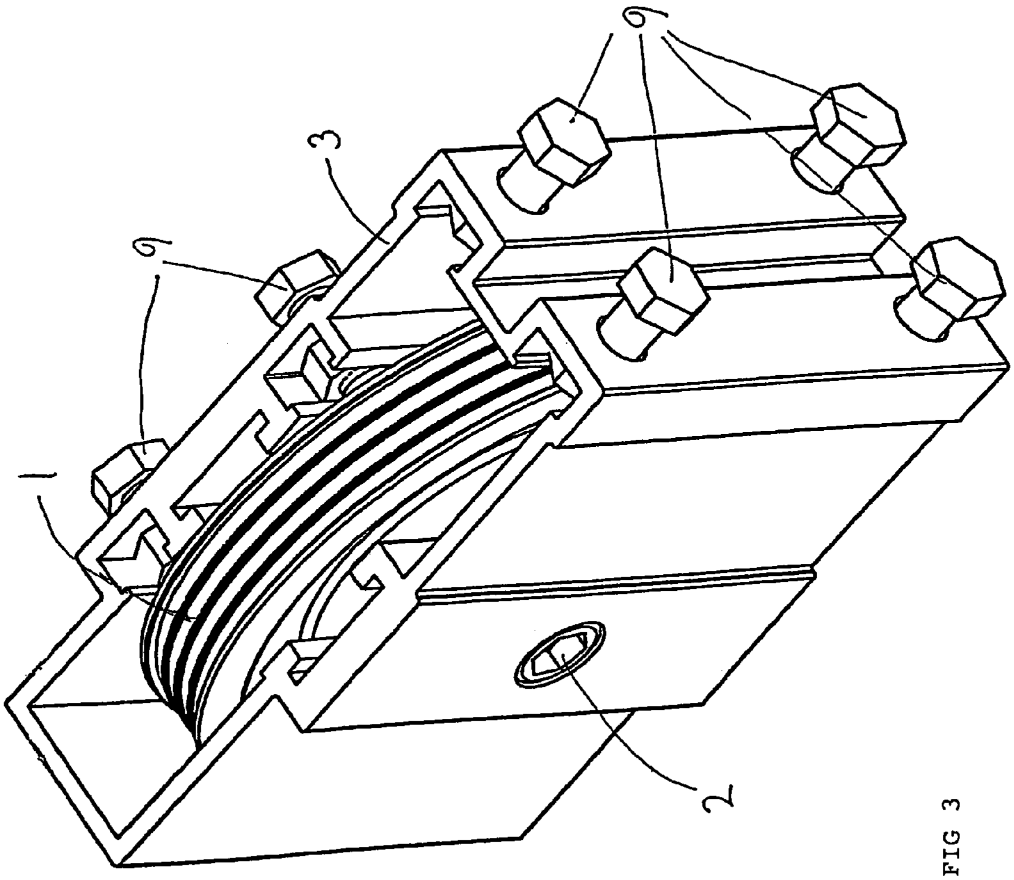

The invention will now be considered in more detail by referring to the attached drawings, wherein FIG. 1 presents a modular diverting pulley solution according to the invention, FIG. 2 presents a modular diverting pulley solution according to the invention, and FIG. 3 illustrates a fastening solution according to the invention.

FIG. 1 presents a diverting pulley 1 mounted in a frame structure 3 by means of supporting elements 2, in this case preferably shafts. The frame structure is preferably so shaped that the diverting pulley is able to rotate inside the frame structure and in addition the frame structure has shoulders shaped so as to keep the shaft of the diverting pulley well in place. Although the diverting pulley presented here has a separate shaft, the invention is not restricted to a solution like this but also allows a solution in which the diverting pulley has a supporting element integrated with it already during manufacture. The frame structure comprises an auxiliary structure 4, which is preferably so shaped that the ropes, which are not shown in this figure, can easily settle in the grooves 5 of the diverting pulley 1.

FIG. 2 presents a diverting pulley 1 together with a frame structure 3 in an oblique side view. In this solution, the supporting element 2 goes through the frame structure 3. In addition, to guide the rope 6, a guide element 7 is provided, which in this solution is preferably a groove made in the frame structure. The groove both guides the rope and keeps it properly positioned. The frame structure in the figure also has fastening points 8 ready made, which may be e.g. holes as shown in the figure. The holes are preferably so made in the frame structure that the whole system can be fastened any way round and also oriented in any direction.

FIG. 3 illustrates a solution for fastening the solution of the invention. Here, as in FIG. 2, the diverting pulley 1 is mounted on a supporter 2, which in this case is preferably a shaft. In addition, the frame structure 3 together with the diverting pulley 1 and the supporter 2 can be fastened by means of fastening elements 9, which in this case are preferably bolts. The solution of the invention naturally allows the use of fastening elements of different types.

Within the framework of the invention it is also possible to think of solutions differing from the above description. Thus the rope used may also consist of a rope band or a combination of a rope and a rope band. Instead of a shaft it is naturally possible to use any supporter solution employing a pin or equivalent.

It is obvious to the person skilled in the art that the invention is not limited to the example described above, in which the invention has been described by way of example, but that different embodiments of the invention are possible within the scope of the inventive concept defined in the claims presented below.

The invention claimed is:

1. A method for installing ropes of an elevator car or elevator car counterweight in an elevator system in a building wherein the elevator system comprises the ropes, a diverting pulley wheel and a frame structure for rotatably supporting the wheel of the diverting pulley in place, the method comprising the steps of;

mounting the ropes on the wheel of the diverting pulley, then mounting the diverting pulley wheel together with the ropes in the frame structure;

then fixing the frame structure to the elevator system in the building to suspend the elevator car or elevator car counterweight.

2. The method according to claim 1, further comprising:

mounting the diverting pulley wheel on the frame structure using a supporting element.

3. The method according to claim 2, wherein the supporting element is a shaft.

4. A method of using at least one diverting pulley wheel for mounting hoisting ropes for an elevator car or an elevator car counterweight in a building, comprising:

mounting the hoisting ropes to the at least one diverting pulley wheel;

then mounting the at least one diverting pulley wheel by means of a frame structure to rotatably support the diverting pulley wheel to which the elevator ropes are mounted;

then fixing the frame structure having the at least one diverting pulley wheel and the hoisting ropes mounted thereto to an elevator system to suspend an elevator car or an elevator car counterweight.

* * * * *